(12) United States Patent
Lawandy

(10) Patent No.: US 8,530,863 B2
(45) Date of Patent: Sep. 10, 2013

(54) FLUORESCENCE NOTCH CODING AND AUTHENTICATION

(75) Inventor: Nabil M. Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 757 days.

(21) Appl. No.: 12/316,037

(22) Filed: Dec. 8, 2008

(65) Prior Publication Data

US 2010/0140501 A1 Jun. 10, 2010

(51) Int. Cl.
*G01J 1/58* (2006.01)

(52) U.S. Cl.
USPC ........... 250/486.1; 250/458.1; 250/459.1; 250/556; 283/94; 283/72

(58) Field of Classification Search
USPC ........... 283/72, 901, 92, 85, 113, 94; 430/10, 430/14, 15; 250/458.1, 486.1, 459.1, 556; 252/301.36, 301.16; 428/690, 411.1; 359/2; 356/71
See application file for complete search history.

(56) References Cited

U.S. PATENT DOCUMENTS

| | | | | |
|---|---|---|---|---|
| 4,451,530 A | * | 5/1984 | Kaule et al. | 428/323 |
| 6,572,784 B1 | | 6/2003 | Coombs et al. | |
| 7,108,286 B1 | * | 9/2006 | Weder et al. | 283/72 |
| 8,330,122 B2 | * | 12/2012 | Smith et al. | 250/458.1 |
| 2006/0196948 A1 | * | 9/2006 | Weber et al. | 235/487 |
| 2008/0106725 A1 | * | 5/2008 | Schuetzmann et al. | 356/71 |
| 2009/0101837 A1 | * | 4/2009 | Kourtakis et al. | 250/459.1 |
| 2010/0084852 A1 | * | 4/2010 | Hampden-Smith et al. | 283/92 |
| 2010/0236432 A1 | * | 9/2010 | Foresti et al. | 101/167 |

OTHER PUBLICATIONS

International Search Report and Written Opinion of the International Searching Authority for International Application No. PCT/US09/66965 (9 pages) mailed on Feb. 17, 2010.
Notification Concerning Transmittal of International Preliminary Report on Patentability for International Application PCT/US2009/088965 (8 pages) mailed on Jun. 23, 2011.

* cited by examiner

*Primary Examiner* — David Porta
*Assistant Examiner* — Yara Green
(74) *Attorney, Agent, or Firm* — Barlow, Josephs & Holmes, Ltd.

(57) ABSTRACT

Systems and methods for document and product authentication using a variety of absorption and emission signatures are disclosed. Emission signatures in the form of florescent or phosphorescent coatings, inks and substrates are used for authentication and protection of items such as documents, currency, and secondary packaging for tobacco, luxury goods and pharmaceuticals. Spectrally overlapping absorption and emission materials are combined to provide a unique spectral fingerprint detectable by a scanner.

27 Claims, 4 Drawing Sheets

FLUORESCENCE NOTCH CODING AND AUTHENTICATION

FIELD OF INVENTION

The present invention relates to security markings, and more specifically to optically encoded phosphorescent and fluorescence security markings from the ultraviolet to the far infrared spectral regions.

BACKGROUND

Counterfeiting and forgery have become significant concerns in the modern economy and marketplace. Advances in computing technology and printing techniques have increased the incidence of forgeries, counterfeited documents, and other fraudulent activities. Countless areas of today's high-technology society require and rely upon certification, authentication and protection of highly valuable documents, papers, currency or other materials.

While fraudulent activities such as counterfeiting currency and forging signatures or handwriting are common, methods of creating and perfecting forgeries and counterfeit documents have become easier and more available with the advent of highly skilled computer printing and processing. As far back as 1991, the United States Treasury has continually added security safeguard features to the denominations of currency in an attempt to combat the use of counterfeit money. These safeguards have included watermarks, security threads embedding in the paper, microprinting, color-shifting ink, and the use of multi-colored bills.

Current methods of authentication of currency involve visual observation scanning under ultraviolet lamps notes containing security threads and emissive materials such as inks and planchettes. Such security threads emit a distinct marking, color or code in response to exposure to the ultraviolet light. In some circumstances, the emissive features of different denominations of notes can emit different colors. In addition to the colors of the emission, a code number or other unique identifier can be detected by the naked eye when the note is exposed to ultraviolet light or excitation of some form.

Authentication of valuable documents or materials affects many facets of the economy. Notary publics use a raised stamp to authenticate notarized documents; drivers' licenses, passports and other photographic identification contain holograms and microprinting; sporting memorabilia and retail clothiers use holographic tags and stamps to prove authenticity. Even fashion designers are now including authentication devices in their clothing to prevent passing off of knock-offs as designer products.

A disadvantage to traditional security features is that they are visible and known to the world. If a counterfeiter is aware there is a security thread in a bill or a watermark in a document, replication of the security feature is easier. Once a feature is made known to the public, a counterfeiter may begin to develop specific strategies and solutions to overcome the security protections provided by the specific feature.

There is a need for a covert security marking to be incorporated into currency, important and valuable documents, packaging, and other authentic materials to prevent unauthorized copying, forging, counterfeiting and other fraudulent use.

SUMMARY

Embodiments of the invention include systems and methods for document and product authentication using a combination of interacting absorption and emission signatures. Emission signatures in the form of florescent or phosphorescent coatings, inks, security threads, planchettes, particles and substrates are used for authentication and protection of items such as documents, currency, and secondary packaging for tobacco, luxury goods and pharmaceuticals.

Absorptive ink coatings and substrates may also be utilized for creating unique optical signatures for authentication and coding. Such signatures are created using a variety of materials including, for example, dyes, quantum dots, semiconductors, and nanostructures with plasmon-polariton resonances. Both emissive and absorptive features are utilized across the electromagnetic spectrum spanning from the ultraviolet spectrum to the infrared ("IR") spectrum. Spectrally overlapping combinations of such features are used to create codes that are covert to the naked eye and signatures through a variety of application methods to imprint articles with such protective measures.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

Embodiments of the invention include florescent or phosphorescent emissions which are combined with a narrow band absorption (narrower than the excitable emission bandwidth) material to create a new type of authentication and coding signature. A broad-band emissive material is combined with one or more a narrow-band absorptive materials having a narrower absorption bandwidth than the emission line to create an emissive signature with one or more specific dips or notches at specific wavelengths. A signature with a series of specific dips or features at given wavelengths may be created when using more than one unique absorber component under the emissive line. Authentication signatures or codes which depend on the spectral positions, shapes and notch depth ratios can be created. Codes or signatures using several combined emissive materials to create a broad emission that overlaps the absorption lines are also possible.

Figure 1:
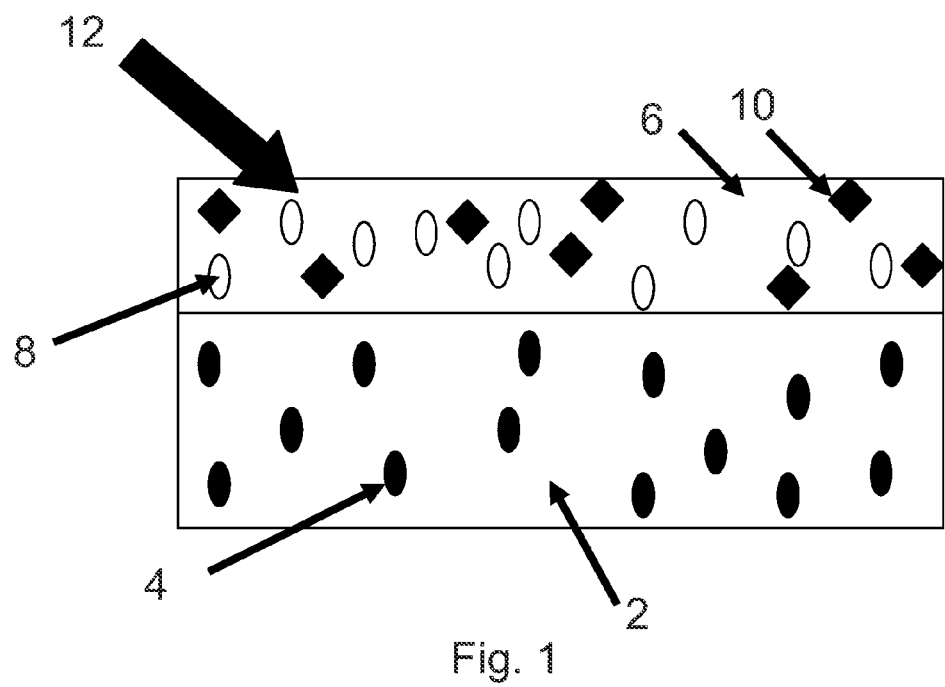
FIG. 1 is a cross-section of a coating which is deposited above a scattering and absorbing substrate in accordance with an embodiment of the invention.

The emissive component can be an ink, security thread, or a coating which is deposited above a scattering substrate containing the substantially narrower absorption line. As shown schematically in FIG. 1, a substrate 2 of paper or plastic is embedded with particles of an absorbing material 4. An ink or dye coating 6 is embedded with one or more emitters 8. In one embodiment the dye or ink coating 6 may include colored pigment particles 10 to exhibit a distinct color when viewed under ambient lighting conditions while also emitting a broad emission line with specific absorption notches when subject to an optical or electrical excitation. The ink or dye coating 6 is deposited on the substrate 2 to form the security feature. When an optical or electrical excitation 12 is applied to the security feature, the combination of the absorbing materials of the substrate and the emitter materials of the coating yield a unique spectral signature. The spectral signature is described below in more detail.

Figure 2:
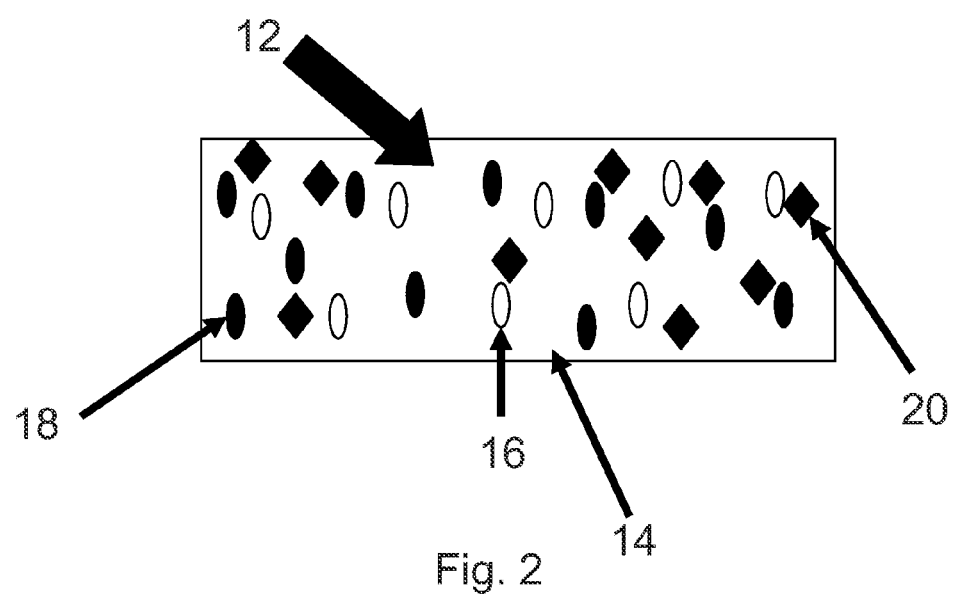
FIG. 2 is a cross-section of a single layer coating or ink in accordance with an embodiment of the invention.

In another embodiment, the absorber and the emitter material can be combined in one layer as a coating or ink. In such an embodiment the use of scattering absorbers and/or emitters enhances the absorptive dip identified in the spectral fingerprint. As shown schematically in FIG. 2, a single layer host material 14, such as a polymer film, is embedded with emitter particles 16 and absorbing particles 18. An optional pigment dye 20 may be employed to give the coating or combined coating-substrate a specific color. The pigment is chosen so that its absorption does not interfere with the absorption of the narrow line under the broader emissive line. When an optical or electrical excitation is applied to the security feature, the combination of the absorbing materials and the emitter materials of the polymer film yield a unique spectral signature or code. According to one embodiment, the coating may be an ink for use in a variety of ink based printing techniques, such as, without limitation, Intaglio and lithographic print.

Figure 3:
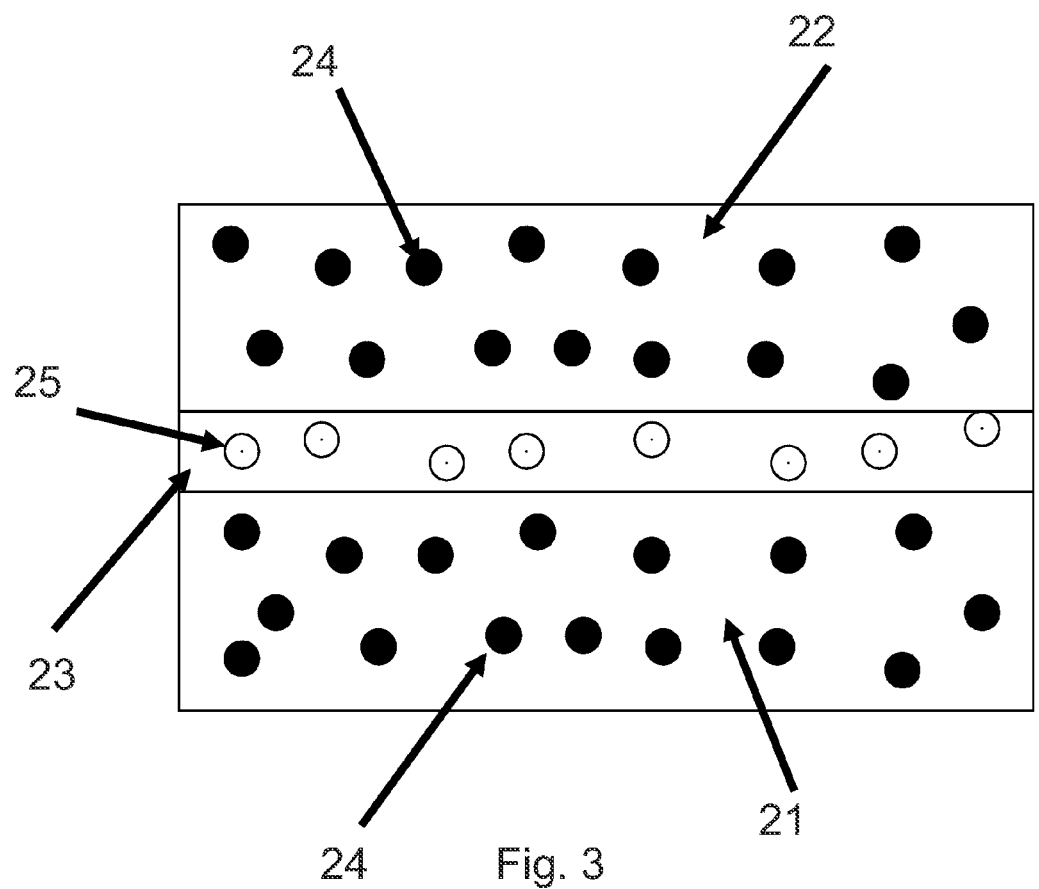
FIG. 3 is a cross-section of a multi-layer coating or ink in accordance with an embodiment of the invention.

Another embodiment, as shown in FIG. 3, includes a multi-layer security feature in which two narrow-band absorbing layers are sandwiched around a broad-band emitter layer. A first layer 21, which may be a paper or polymer substrate, contains a plurality of one or more types of narrow-band absorbing particles 24. A middle layer 23, such as a polymer host or a security thread, is disposed on the first layer 21. The middle layer includes a plurality of one or more types of broad-band emitter particles 25. A top layer 22 is disposed on the middle layer, which includes a plurality of one or more types of narrow-band absorbing particles 24.

The spectral emissions of a security feature may be used to identify and verify the authenticity of an article. A spectral emission may be illustrated by showing the intensity of the feature as a function of wavelength. A spectral emission from a typical security feature yields a signature with few detectable features across the wavelength spectrum. According to one embodiment of the invention, the security feature is enhanced such that excitation of the feature creates a distinct spectral pattern that may be analyzed to verify authenticity. If, upon scanning the spectral emission of the article containing the feature, the expected emissive signature does not match an expected signature, the article is a forgery or has been tampered with. If the signature matches the expected pattern or value, the document is authentic.

Figure 4:
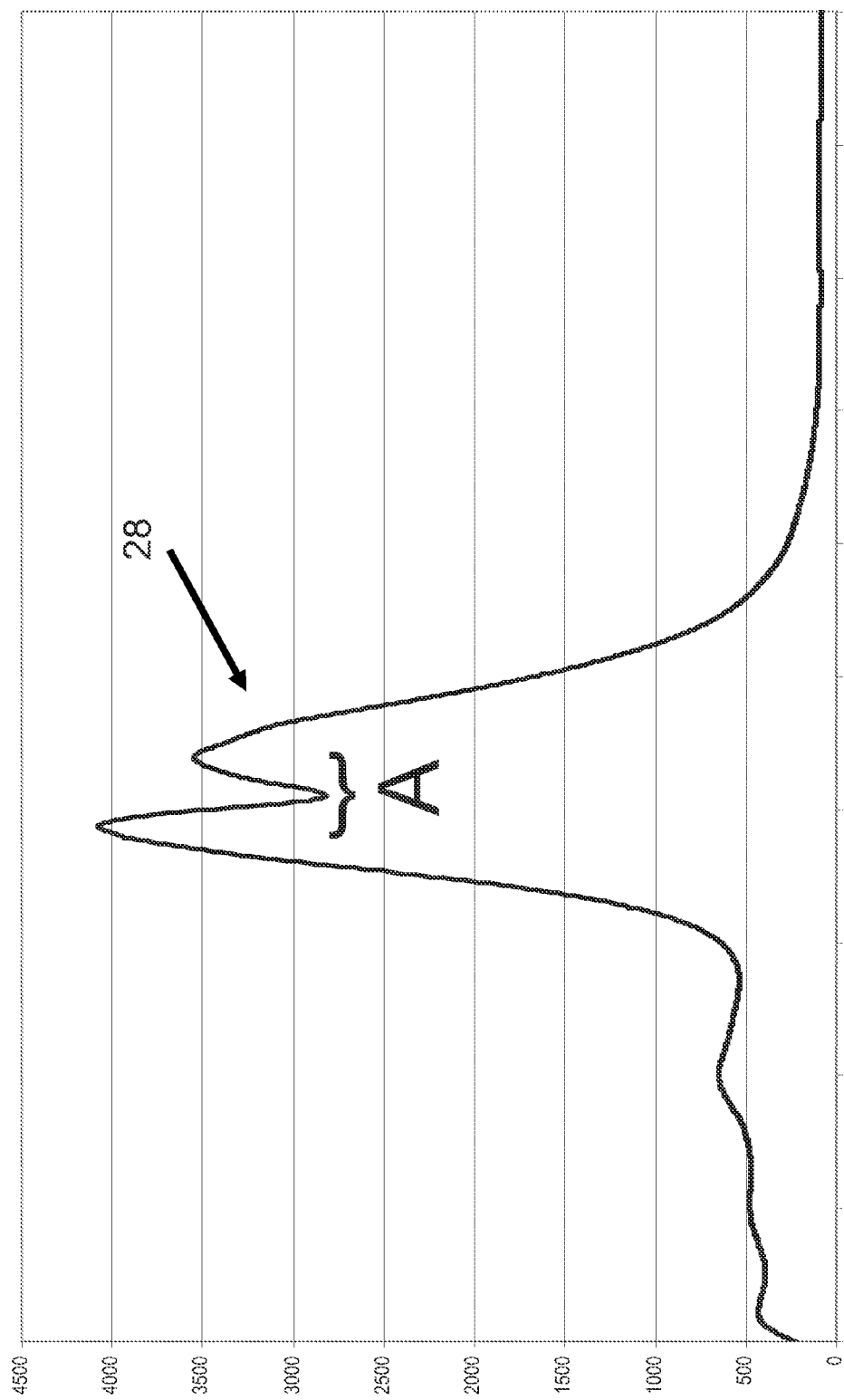
FIG. 4 is an illustrative graph of the spectral emission of an enhanced security feature in accordance with an embodiment of the invention.
Figure 5:
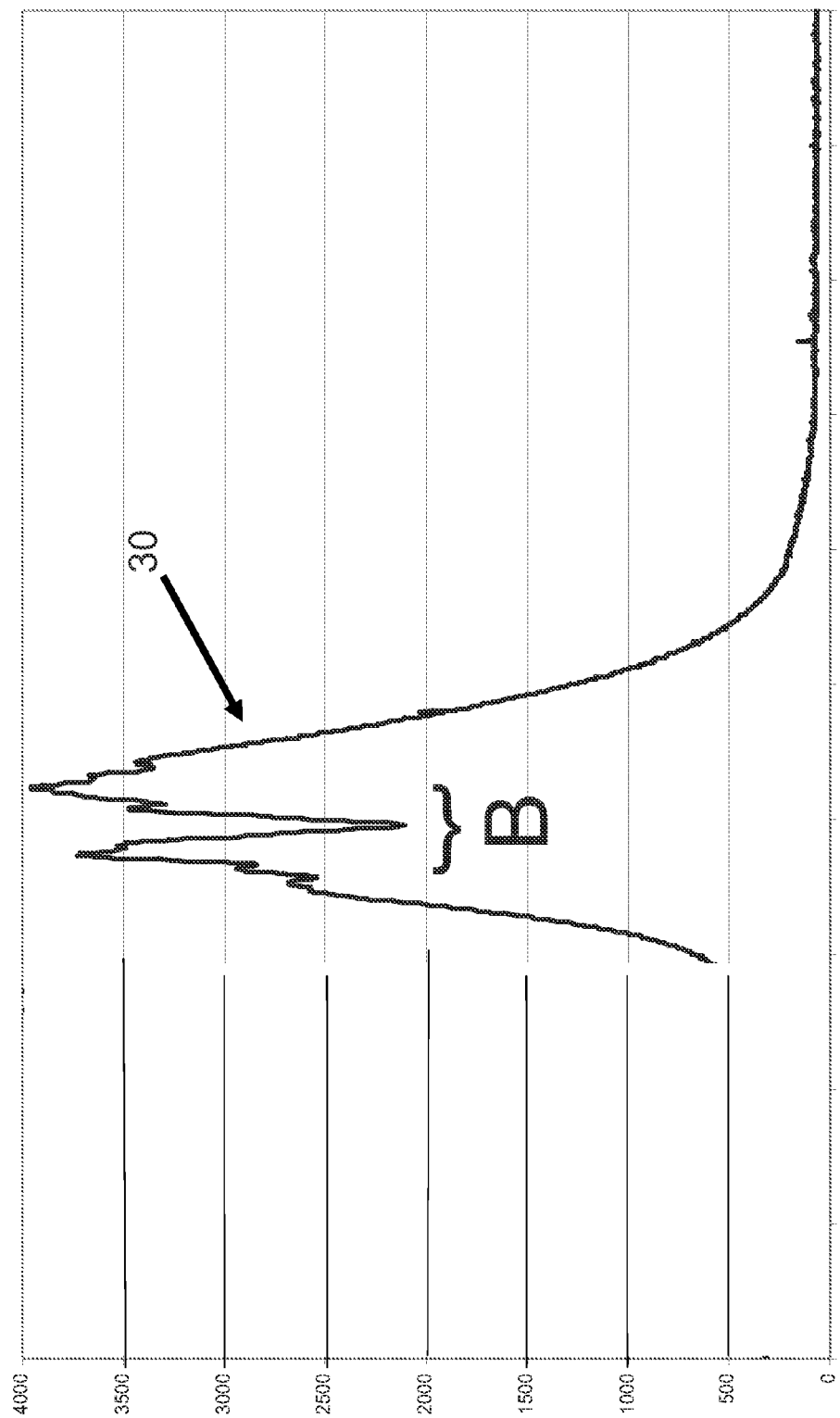
FIG. 5 is an illustrative graph of the spectral emission of an enhanced security feature in accordance with an embodiment of the invention.

FIGS. 4 and 5 show examples of the fluorescent notch effect using a chromophore having broad-band emitters and narrow-band absorbers. FIG. 4 depicts a graph of the spectral emission intensity as a function of wavelength. A spectral emission of the chromophore yields a signature 28 having unique and definable features at given wavelengths. In the example shown in FIG. 4, a dip in the spectral emission occurs at a wavelength denoted as 'A'. FIG. 5 is yet another illustrative spectral fingerprint 30 of a security feature in accordance with an embodiment of the invention. The spectral fingerprint experiences a drastic dip in the intensity due to absorption around the wavelength region denoted as 'B'. These absorption features are undetectable to the human eye; however, the feature is machine-readable requiring only the use of a spectrometer or other spectral sensor.

According to one embodiment of the invention, a machine-readable, covert security feature is included for use in security threads in a currency note or other valuable document. A covert security feature may be embedded within the security thread or planchette, resulting in no apparent visible change of the excited signature of the threads when viewed using a standard ultraviolet source or lamp or other appropriate excitation source. The covert security feature, while undetectable to the naked eye, emits a specific and distinct spectral fingerprint. The incorporation of the new machine readable, covert feature is implemented without any change to the public perception of the excited emission signature, thereby making forgery or duplication of the note more difficult.

According to one embodiment, the security feature appears as a series of sharp, chemically robust and stable spectral dips within the existing, much broader emission of the emissive security feature as shown in FIG. 5. When the note is subject to excitation, such as an ultraviolet lamp, the security feature within the note appears as the existing one already in use. When the emission of the note, however, is analyzed with a spectrometer or other spectrally resolving instrument, such as a spectrometer or detector-filter arrangement, the spectral emission of the security feature yields additional characteristics that cannot be seen by the human eye under ultraviolet excitation or other appropriate excitation.

Authentication of the embedded covert signature is based on the presence of all of the spectral features found in a signature. These features include, without limitation, spikes or dips at the specific wavelengths, as well as relative ratios found throughout the spectral range. The precision of these wavelengths features may be defined to better than one part in a thousand and their ratios are can be prescribed to better than 10% accuracy according to one embodiment. The sharpness of the absorption notches results in no apparent change in the color or appearance of the phosphorescent or fluorescent emission.

One embodiment of the invention includes a sensor for authenticating and or denominating currency. The sensor includes a spectrometer or spectrally resolving component which is configured to scan the spectral emission of the emissive feature in a currency note under optical or electrical excitation. Alternatively, an embodiment of the invention includes a scanner, sensor or other device that may be built into existing note sorting or authentication machines with little or no retrofitting or adaptation. The security feature, according to one embodiment, can be read at high speeds at rates exceeding forty banknotes per second rate using machines sold by Geisecke and Devireint, De La Rue International and other banknote processing machine manufacturers.

While embodiments of the invention described herein show and describe spectral emissions with one spectral dip, one skilled in the art should recognize that any number of spectral characteristics may be incorporated into a security feature without deviating from the scope of the invention. For example, one or more types of emitter particles or absorbing particles may be incorporated into the security feature to provide a series of spectral dips, spikes or another distinguishable characteristics.

Further, while embodiments of the invention described herein discuss the excitation from an ultraviolet lamp, one skilled in the art should recognize that the covert distinguishable characteristics of the security feature are not limited to the ultraviolet spectrum. For example, an ink or dye may contain identifying spectral notches in other spectral ranges such as the infrared range, i.e., an ink dye or other feature having no absorptive notch or notches in the ultraviolet or visible range may have a spectral notch, or multiple notches in the infrared spectrum.

One embodiment of the invention includes excitation of the security feature, which may occur at more than one wavelength to reveal different spectral bands including distinguishable broad emissions with absorptive notches. For example, an intaglio ink may have visible and invisible infrared emission characteristics that may be excited by one or more sources with one or both emission bands containing one or more absorptive notches.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method of authenticating an article comprising:
providing a first electromagnetic absorbing substance within said article capable of absorbing emissions at at least one narrow spectral range;
providing a second electromagnetic emitter substance within said article and at least partially obscured by said first absorbing substance capable of emitting an emission across a spectral range; and
creating an emission spectral signature in response to excitation of the emitter substance that overlaps the at least one narrow spectral range of the absorbing substance.

2. The method of claim 1 further comprising disposing the absorbing substance in a scattering substrate.

3. The method of claim 2 further comprising disposing the emitter substance in a coating on the scattering substrate.

4. The method of claim 1 further comprising disposing the absorbing substance and the emitter substance in a coating on a substrate.

5. The method of claim 1 further comprising providing a pigment or dye that emits a color under ambient lighting conditions.

6. The method of claim 1 further comprising disposing the absorbing substances and emitter substance on a security thread.

7. The method of claim 6 further comprising embedding the security thread in a currency note.

8. The method of claim 1 wherein the excitation is caused by an ultraviolet source.

9. The method of claim 1 further comprising disposing the emitter substance in a layer between a first and second substrate layer, the first and second substrate layer comprising the absorbing substance.

10. The method of claim 1 wherein the spectral signature comprises a plurality of notches within a spectral band.

11. The method of claim 10 wherein the spectral band is selected from the group consisting of the visible band, ultraviolet band and the infrared band.

12. The method of claim 1 wherein the emission spectral signature includes a notch in at least two spectral bands.

13. A security feature comprising:
a plurality of first absorbing particles or compounds capable of absorbing emissions at at least one narrow spectral range;
a plurality of second emitter particles or compounds at least partially obscured by said first absorbing particles capable of emitting an emission across a spectral range; and
wherein excitation of the absorbing particles or compounds and the emitter particles or compounds creates a unique spectral signature in conjunction with at least one overlapping narrow spectral range.

14. The security feature of claim 13 further comprising a scattering substrate, the absorbing particles or compounds being disposed in the substrate.

15. The security feature of claim 14 wherein the emitter particles or compounds are disposed in a coating on the scattering substrate.

16. The security feature of claim 15 wherein the coating contains a dye, phosphor or other emitter.

17. The security feature of claim 15 wherein the coating is an ink.

18. The security feature of claim 17 wherein the ink is selected from the group consisting of an Intaglio ink and a lithography ink.

19. The security feature of claim 13 wherein the emitter particles or compounds and the absorbing particles or compounds are selected from the group consisting of: quantum dots, dyes, chelates, metal-organics, rare-earth metals and nanostructure with plasmon-polariton resonance.

20. The security feature of claim 13 wherein the substrate comprises a security thread of a currency note.

21. The security feature of claim 13 wherein the absorbing particles or compounds and the emitter particles or compounds are disposed in a coating on a substrate.

22. The security feature of claim 13 further comprising a pigment that provides a color under ambient lighting.

23. The security feature of claim 13 wherein the excitation is due to exposure to an ultraviolet source.

24. The security feature of claim 13 wherein the unique spectral signature comprises a plurality of notches within a spectral band.

25. The security feature of claim 24 wherein the spectral band is selected from the group consisting of the visible band, ultraviolet band, the infrared band, and combinations thereof.

26. The security feature of claim 13 wherein the unique spectral signature comprises one or more absorptive notches in at least two spectral bands.

27. The security feature of claim 24 wherein the unique spectral signature comprises a ratio of depths of absorptive notches corresponding to two or more notches.

* * * * *